(12) United States Patent
Peter

(10) Patent No.: US 8,825,879 B2
(45) Date of Patent: Sep. 2, 2014

(54) SESSION INFORMATION TRANSPARENCY CONTROL

(75) Inventor: Henry Thomas Peter, Mountain House, CA (US)

(73) Assignee: Dialogic, Inc., Milpitas, CA (US)

( * ) Notice: Subject to any disclaimer, the term of this patent is extended or adjusted under 35 U.S.C. 154(b) by 187 days.

(21) Appl. No.: 13/364,623

(22) Filed: Feb. 2, 2012

(65) Prior Publication Data

US 2013/0205033 A1     Aug. 8, 2013

(51) Int. Cl.
    *G06F 15/16* (2006.01)
(52) U.S. Cl.
    USPC ............................ 709/228; 709/204; 709/218
(58) Field of Classification Search
    CPC ... H04L 7/0337; H04L 67/125; H04L 67/104; H04L 69/24
    USPC .......................................... 709/204, 218, 228
    See application file for complete search history.

(56) References Cited

U.S. PATENT DOCUMENTS

| | | | |
|---|---|---|---|
| 2003/0014297 A1* | 1/2003 | Kaufman et al. | 705/9 |
| 2005/0257250 A1* | 11/2005 | Mitchell et al. | 726/3 |
| 2006/0259583 A1* | 11/2006 | Matsuura | 709/218 |
| 2006/0277185 A1* | 12/2006 | Sato et al. | 707/9 |
| 2007/0005795 A1* | 1/2007 | Gonzalez | 709/232 |
| 2008/0062459 A1* | 3/2008 | Harrison et al. | 358/1.15 |
| 2010/0057712 A1* | 3/2010 | Ranganathan | 707/5 |
| 2010/0105362 A1* | 4/2010 | Yang | 455/414.1 |
| 2010/0118109 A1* | 5/2010 | Sakai et al. | 348/14.01 |
| 2011/0113430 A1* | 5/2011 | Fuse | 718/102 |
| 2011/0288962 A1* | 11/2011 | Rankin et al. | 705/27.1 |
| 2012/0016996 A1* | 1/2012 | Samavedam et al. | 709/227 |
| 2012/0089677 A1* | 4/2012 | Shafran et al. | 709/204 |

OTHER PUBLICATIONS

Specification and Evaluation of Transparent Behavior for SIP Back-to-Back User Agents; Aug. 2010.
Re: Transparency—Top 10 List; May 2002.

* cited by examiner

*Primary Examiner* — Tesfay Yohannes
(74) *Attorney, Agent, or Firm* — Chapin IP Law, LLC

(57) ABSTRACT

Transparency control for session information for a communication network node can be set on a dynamic and/or static basis in relation to properties of a peer, an interface, a trust level, a session or a message. The transparency control can be based on message-related parameters, with the transparency of certain message parts being controlled on a static and/or dynamic basis in relation to transparency control settings. The transparency control can change upon the occurrence of a rerouting event that implicates recalculated transparency control settings. A message can be marked with transparency type settings that are evaluated to determine transparency control for the message. The transparency control can be based on transparency types of topology, dialog, identity, header, body, media, functional or accounting. The transparency control settings can be user selectable to permit transparency behavior tailored to the desires of an operator of the communication network node.

20 Claims, 15 Drawing Sheets

| Message Ingress Interface Network Type | Message Egress Interface Network Type | Message Egress Peer Trust Level | Topology Transparency | |
|---|---|---|---|---|
| Local | Interconnect | N/A | No | 920 |
| Interconnect | Interconnect | Low/Medium | No | 921 |
| Interconnect | Local | N/A | Yes | 922 |
| Any | Any | Any | Use Static Values | 923 |

910  911  912  913

900

Media Interception

| Media Interception Configuration in Media Profile | THIG Status | Media Transparency | Action |
|---|---|---|---|
| Yes | Any | Any | Intercept Media |
| No | Yes | Any | Error Condition |
| No | No | No | Error Condition |
| No | No | Yes | Pass-thru without mdia intercept (codec filtering can |

SESSION INFORMATION TRANSPARENCY CONTROL

CROSS REFERENCE TO RELATED APPLICATIONS

Not applicable

STATEMENT REGARDING FEDERALLY SPONSORED RESEARCH OR DEVELOPMENT

Not applicable

FIELD OF THE INVENTION

The present disclosure relates generally to session information control for communication sessions in a communication network, and more particularly to transparency control for information related to a communication session in a communication network.

BACKGROUND OF THE INVENTION

Communication networks continue to evolve with the introduction and application of packet-switched networks composed of internet protocol (IP) devices that switch packets of data. Such networks are often used to implement voice over IP (VoIP) as opposed to the traditional time division multiplexed (TDM) communication implementations typically carried over a circuit-switched network. With the introduction and prevalence of packet-switched networks, interfaces between the traditional circuit-switched networks and packet-switched networks have become an important part of communication network infrastructure. These interfaces are often controlled with a softswitch, which is responsible for controlling interface devices that process media such as by providing conversion services between circuit-switched and packet-switched infrastructures. In a packet-switched network, call signaling functions are typically implemented with the session initiation protocol (SIP) or the H.323 protocol. SIP has become widely adopted for use in establishing, modifying and clearing communication sessions in packet-switched networks including IP-based networks. In some such IP-based networks, softswitches use SIP to facilitate session processing, typically within a network domain that may be interconnected with other domains serviced by corresponding softswitches. Signaling messages for processing sessions thus typically cross domain boundaries, but can carry information related to a specific domain that an operator may not wish to expose.

Referring to FIG. 1, a conventional IP network 100 is illustrated, showing interconnections between different network domains 102, 104 and 106. The borders of network domains 102, 104 and 106 include session border controllers (SBCs) 110-113 that operate to provide protection and security for internal systems of network domains 102, 104 and 106. The signaling messages exchanged between network domains 102 and 104 and between network domains 104 and 106 pass through respective pairs of SBCs 110, 111 and 112, 113 and tend to carry information related to the structure of network domains 102, 104 and 106. Such topology transparency that shows the internal structure of the network implementing each of network domains 102, 104 and 106 is often undesirable as posing a security risk.

Referring now to FIG. 2, a conventional SBC 200 is located at a boundary of a private inner IP network 204 and a public, or outer IP network 205. SBC 200 can intercept signaling 202 and media 203, and may take the form of a back to back user agent (B2BUA), which employs separate dialogs on either side, i.e., with respective networks 204 and 205, to implement a communication session. The B2BUA configuration operates to terminate each of the dialogs and provides services such as routing between the dialogs to implement the communication session. In some instances, an SBC is configured as a proxy, which is intended to route session messages with a high degree of transparency, meaning that the messages are as unchanged as possible while still accomplishing the proxy function of routing.

Referring now to FIG. 3, the configuration and operation of a conventional SBC 300 is illustrated. SBC 300 handles access and interconnect traffic through the various interfaces 310-315. Interfaces 310-315 have attributes or properties related to protocol (SIP or H.323), IP address and port, and transport type, such as UDP or TCP. SBC 300 employs functional entities for routing including interconnect border control function (IBCF) routing and proxy call session control function (P-CSCF) routing. These functional entities contribute to performing routing in SBC 300 for messages involved in various sessions and dialogs among the various network entities.

Referring to FIG. 4, an exemplary SIP message processed by SBC 300 is illustrated. An incoming SIP message 310 is described as being received at SBC 300 as an ingress message, while SIP message 312 is described as being sent from SBC 300 as an egress message. SIP message 310 includes various information items identified as I1-I5, which may correspond to headers or content information of SIP message 310. SBC 300 receives SIP message 310 and implements control on the content of SIP message 310 to perform security functions, for example. SBC 300 typically inspects information items I1-I5 and determines whether to pass, modify or drop any of information items I1-I5. As can be seen by the content of egress SIP message 312, information items I1 and I4 are dropped, while information I3 is modified and information items I2 and I5 are passed without change.

The information items I1 and I4 being dropped from egress SIP message 312 may represent certain identification information that an operator of SBC 300 may not generally wish to pass. Sometimes, identification information is used to provide assurance for a trusted entity to implement a form of security. Identification information may sometimes also be used to identify a party, such as a carrier, to permit certain communication activities to occur on a more secure basis. However, when SBC 300 is configured with a direct, static setting for dropping information items I1 and I4, the functions associated with the dropped identification information may not be possible.

Referring now to FIG. 5, a diagram 500 illustrates operation of SBC 300 involved in a session between Peer A 510 and Peer B 512. Diagram 500 illustrates a SIP session initiated with an invite request from Peer A 510. Diagram 500 shows the typical sequence of events for request/response activities with respect to each of Peer A 510 and Peer B 512. For example, SBC 300 passes invite request 520 from Peer A 510 to Peer B 512, but initiates a response with identifier "100" to Peer A 510 and absorbs or terminates a response with identifier "100" from Peer B 512. Each of the messages that are passed by SBC 300 between Peer A 510 and Peer B 512 may be subject to transparency-related modifications to implement security functions or to achieve other behavior related to border operations between two domains.

Due to the nature of cross-border communications between network domains, it can be challenging to implement a consistent transparency control that achieves the goals of the operator. Conventional systems tend to be limited to unconditionally hiding or controlling transparency for specific information such as topology due to the limitations of the SBC modeled as a B2BUA. In addition, specific workarounds for transparency to achieve desired information exposure across boundaries can be complex and may lead to operational challenges in implementing a desired level of transparency on the part of the operator. Moreover, conventional transparency control is not easily used to accommodate changing situations, such as, for example where messages related to a given session are re-routed to a new peer and/or interface.

SUMMARY

In accordance with the present disclosure, session information transparency control can be provided on a dynamic and/or static basis to obtain a flexible and specific transparency control policy for session communications at a communication network node. The dynamic aspect of the transparency control policy can be disabled, thus defaulting to static settings, or enabled, thus permitting decisions to be made for blocking, modifying or passing message information in accordance with various properties and/or parameters associated with the message. The dynamic settings can be made dependent upon particular transparency types, such as a topology transparency type, to permit decisions to be made in conjunction with a number of factors determined by the dynamic and/or static settings.

According to an aspect of the present disclosure, transparency control policies can be based on properties associated with a communication network peer, interface, trust level, session or message. Properties associated with one, some, or all of these or other items may be used to determine how message information is to be processed with respect to transparency, such as by dropping, modifying or passing such message information. Settings that can be generally applicable to session messages can be overridden based on specific settings that can be matched with property values of one or more of the above items. Static settings can be used to provide an overall default for transparency control, which can be implemented on a global basis for a given communication network node.

According to another aspect of the present disclosure, transparency control settings are recalculated upon a change in the session of interest. For example, if session messages are rerouted to a new peer and/or interface, transparency control settings can be recalculated specifically for the new peer and/or interface to obtain a desired transparency control granularity in accordance with the desires of an operator. The transparency control settings can be made dependent on other recalculated transparency control settings, so that some settings can take on new values that depend upon the values of other transparency control settings.

According to another aspect of the present disclosure, transparency control policies can be implemented based on properties related to topology, dialog, identity, header, body, media, accounting or functional transparency types in relation to a given session message of interest. Various properties of the above-noted transparency types may be inspected to determine a transparency control setting for the given session message.

According to another aspect of the present disclosure, a communication network node configured in accordance with the subject matter of the present disclosure can provide marking information to portions of a session message to indicate the type of information it contains. The marking may be, for example, in the form of flag that can be used to identify one or more transparency types that can be used to implement a particular transparency control policy for the message.

According to another aspect of the present disclosure, transparency types that are set to be dynamic imply the consultation of a table to determine transparency settings. Rows of the table provide specific instances of circumstances for a given session message to determine the transparency setting for the specified transparency type. For example, if the criteria of a given row of such a table are matched by the session message, the transparency setting designated for that row is employed to establish the transparency behavior of the session message with respect to that transparency type.

BRIEF DESCRIPTION OF THE SEVERAL VIEWS OF THE DRAWINGS

The present disclosure is described in greater detail below, with reference to the accompanying drawings, in which:

FIG. 11 is a table illustrating exemplary settings involving media profile configuration, topology hiding and media transparency for transparency control related to media interception according to an exemplary embodiment of the present disclosure;

DETAILED DESCRIPTION OF THE INVENTION

In accordance with the present disclosure, transparency control policies for a node in a network that carries and/or processes signaling information are provided. The policies are configurable settings that can be applied with respect to the network node to control the types and content of information that passes through the node, is generated at the node, or terminates at the node. The present disclosure provides for configuration and application of transparency control policies based on a number of criteria, to provide a flexible and specific result for managing signaling information in relation to a network node.

Figure 1:
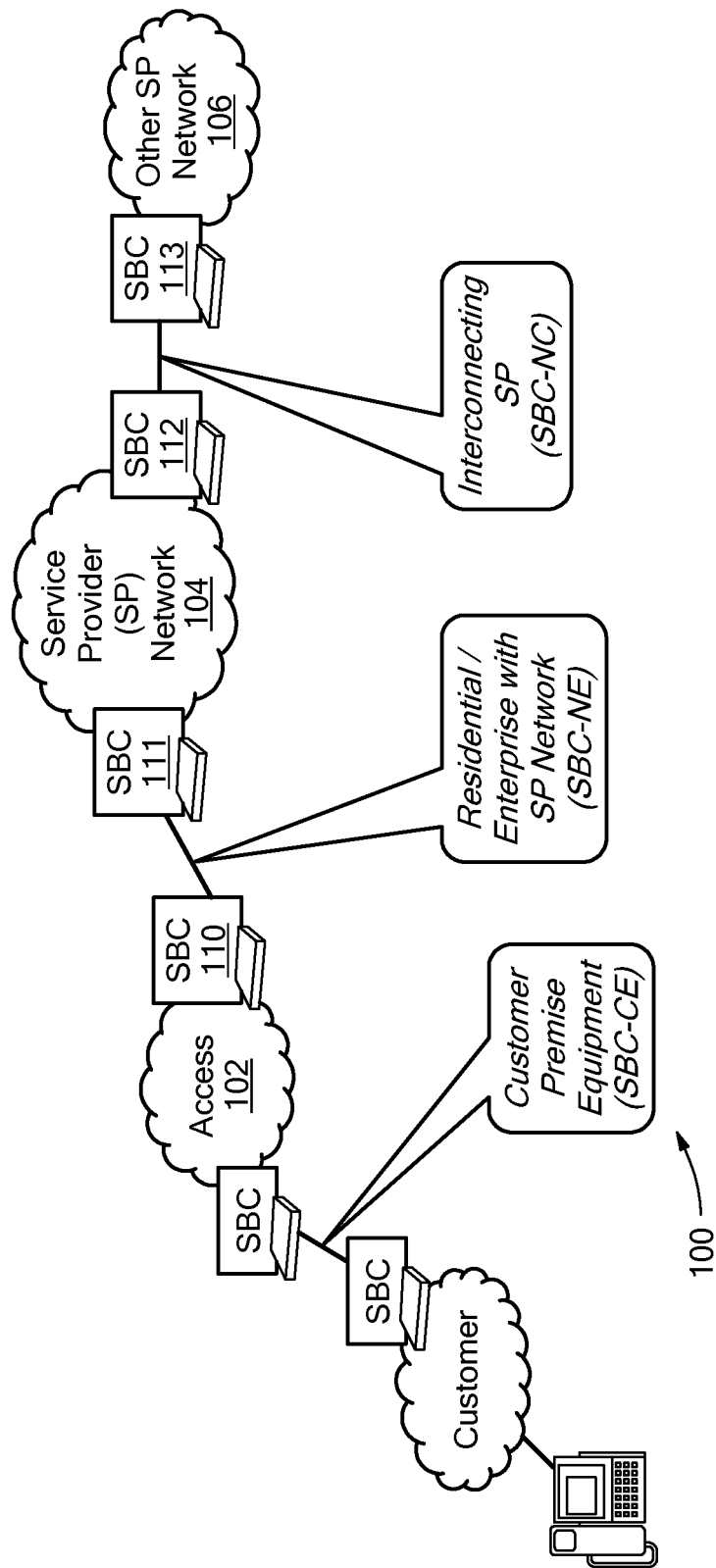
FIG. 1 is a diagram of a conventional communication network.
Figure 2:
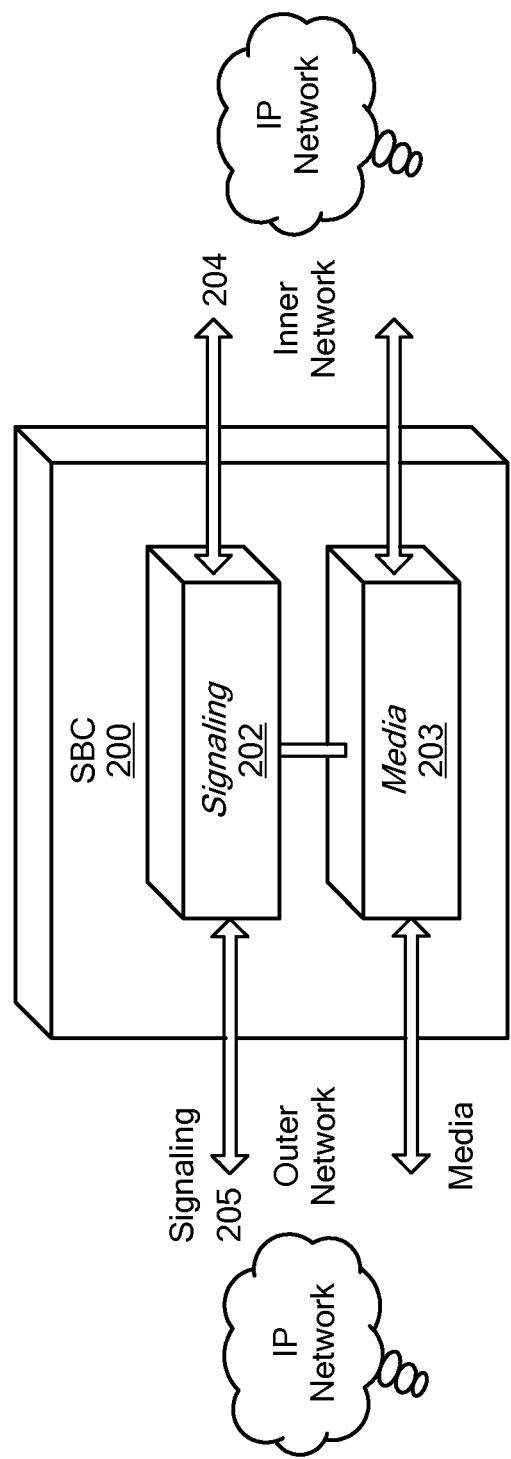
FIG. 2 is a diagram of a component of the conventional communication network of FIG. 1.
Figure 3:
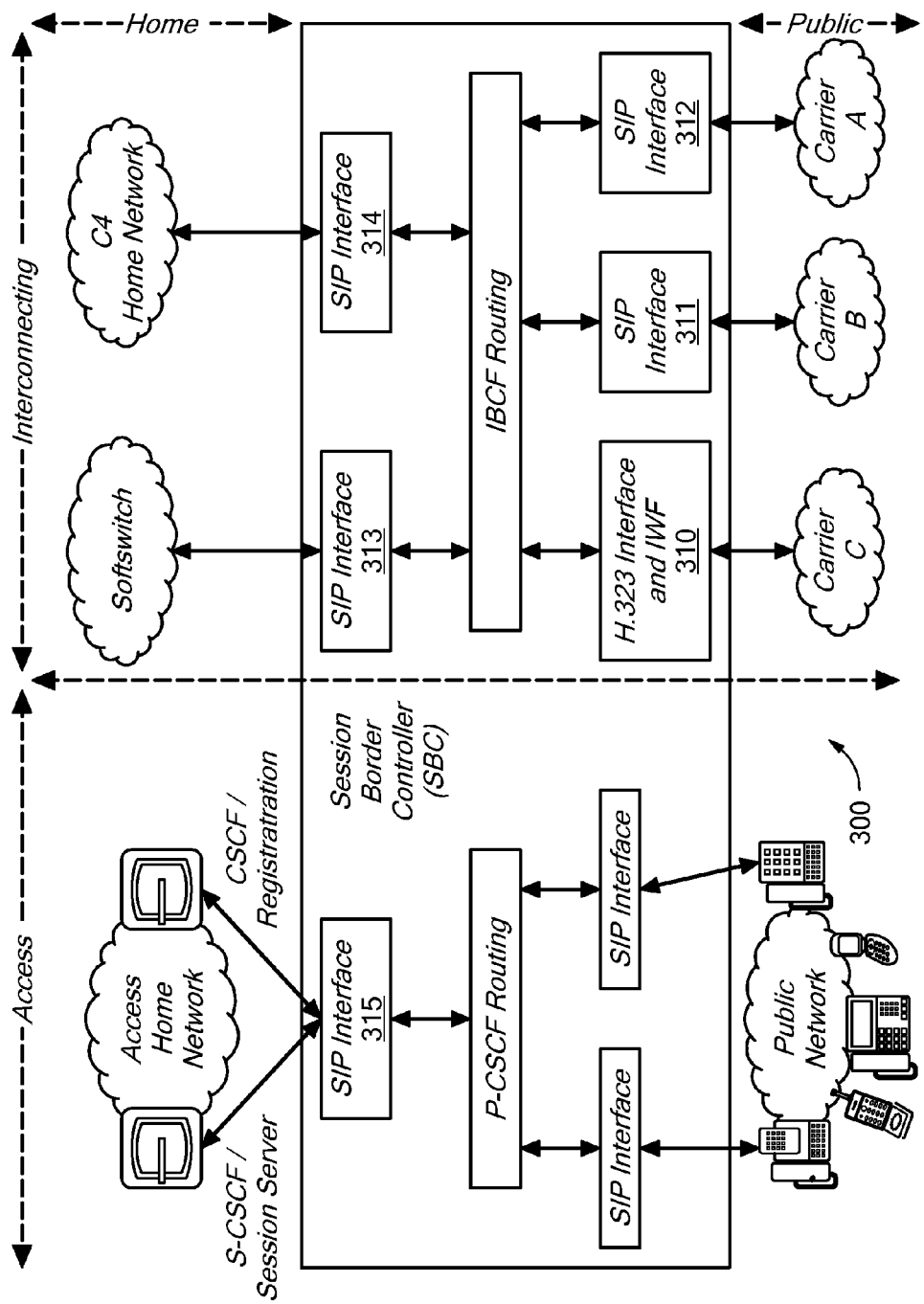
FIG. 3 is a diagram of the configuration and operation of the component of FIG. 2.
Figure 4:
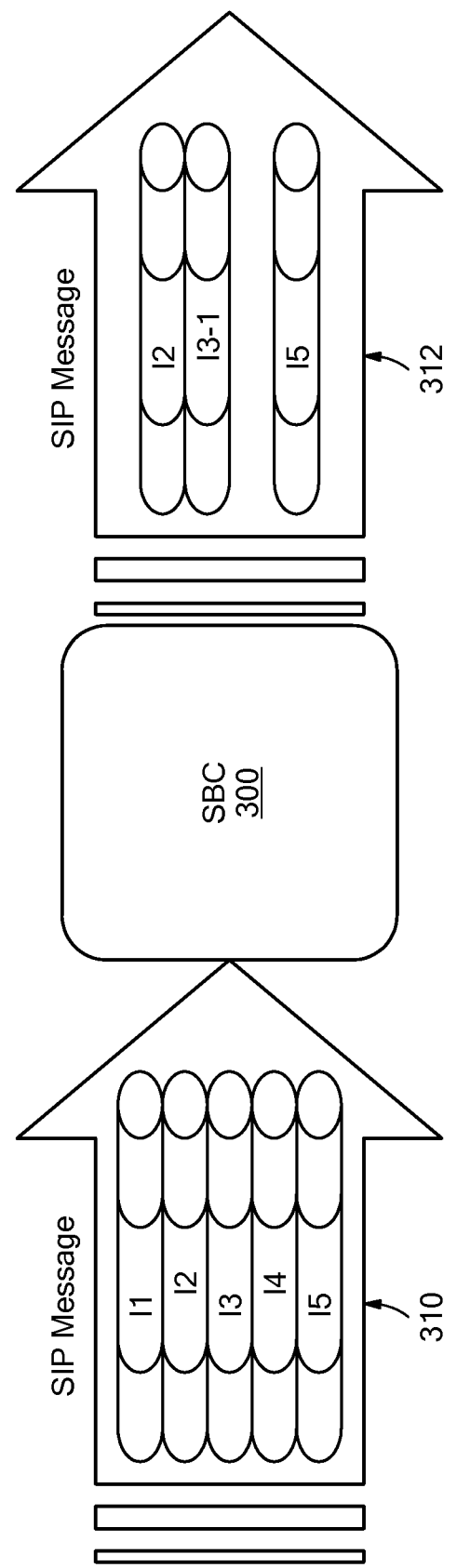
FIG. 4 is a diagram illustrating a conventional implementation of transparency control.
Figure 5:
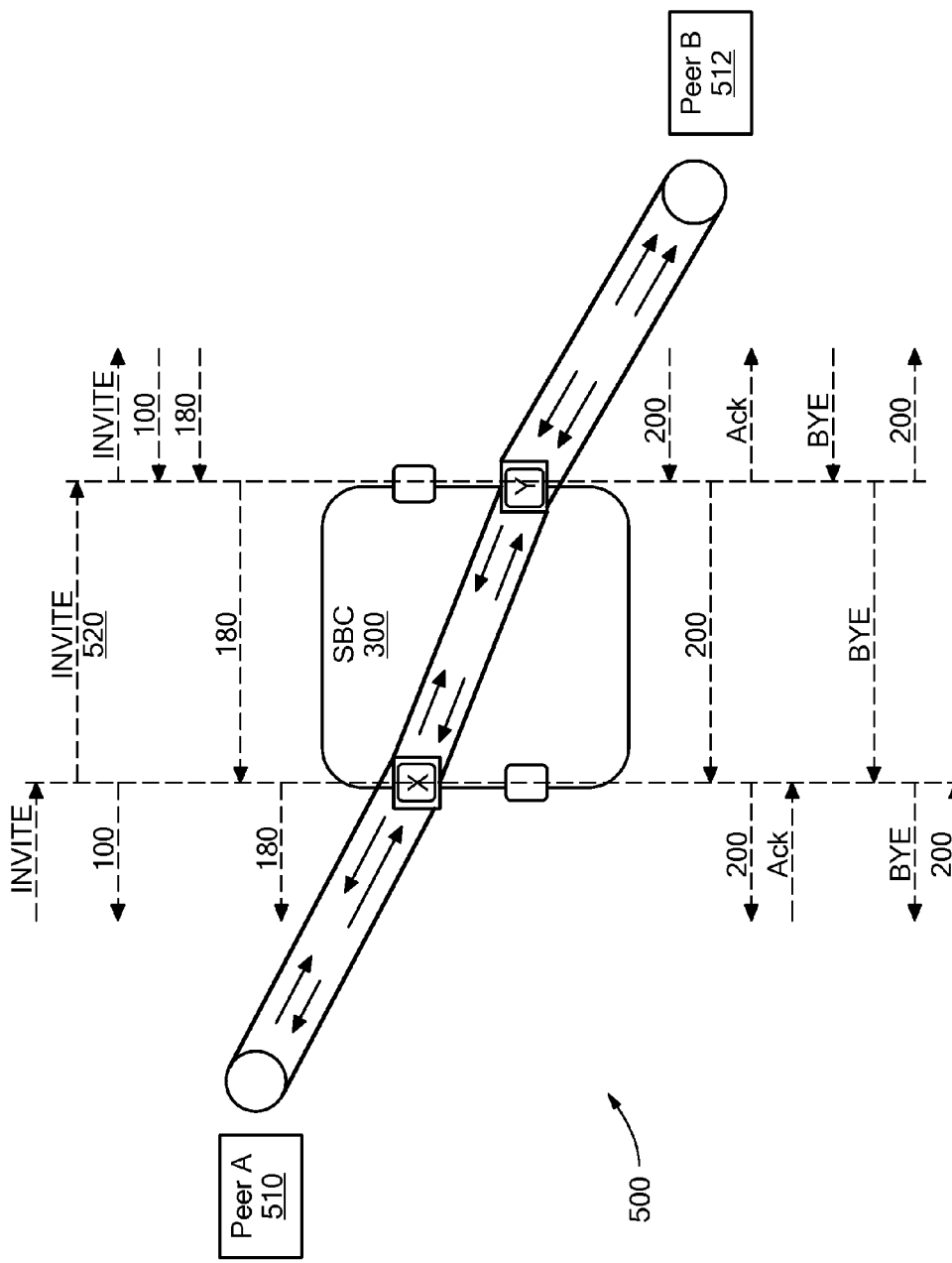
FIG. 5 is a diagram illustrating messages involved in a conventional communication session.
Figure 6:
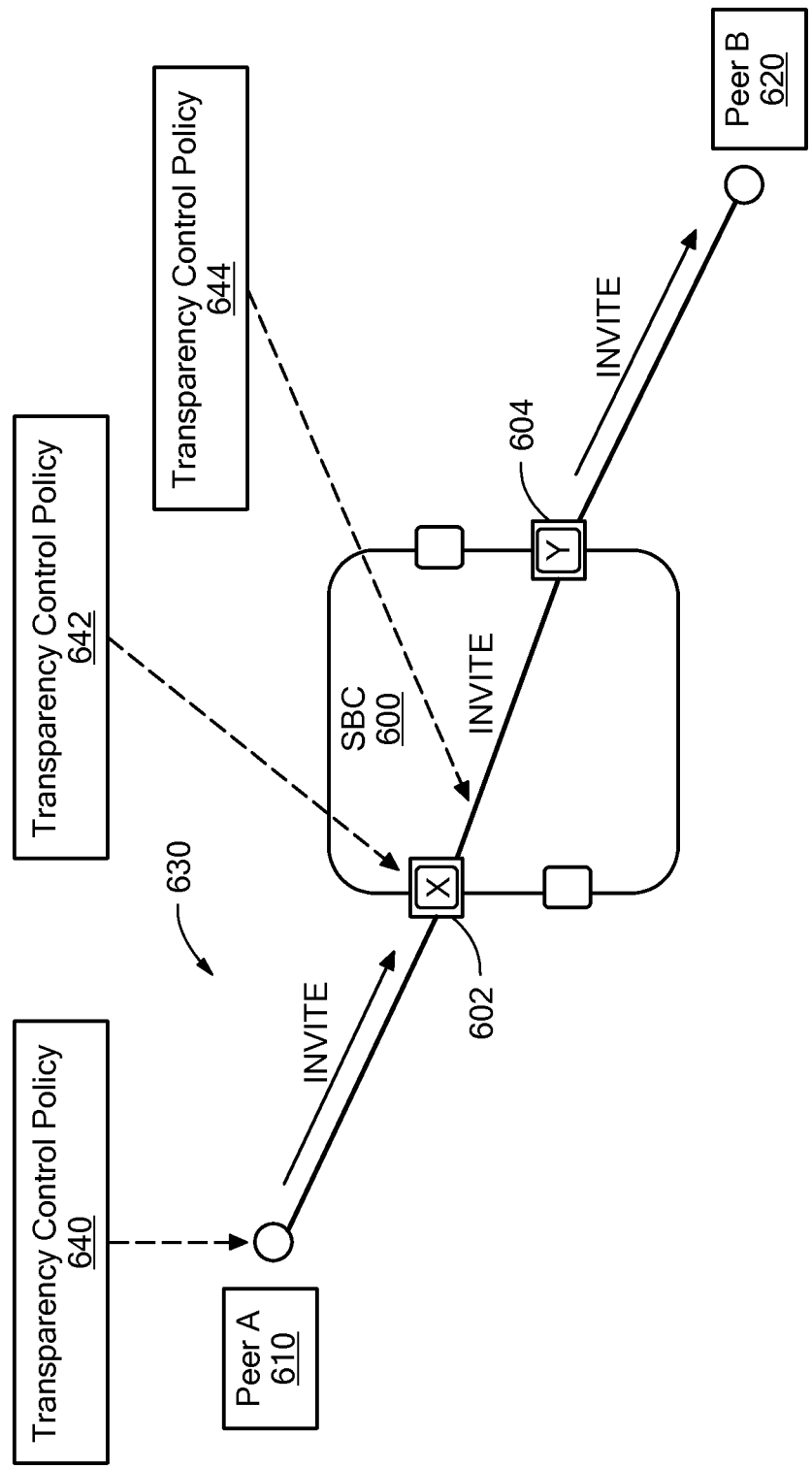
FIGS. 6 and 7 are diagrams of an exemplary communication component implemented with transparency control policies in accordance with an exemplary embodiment of the present disclosure.

Referring now to FIG. 6, an exemplary embodiment of the present disclosure is illustrated with a session border controller (SBC) 600 that operates as a network node that manages signaling traffic. SBC 600 manages signaling information between Peer A 610 and Peer B 620 and is shown in FIG. 6 as processing an invite request 630 from Peer A 610 that is to be directed to Peer B 620. In the embodiment that is illustrated in FIG. 6, transparency control policies can be implemented in relation to Peer A 610, an ingress interface 602 or internally to SBC 600 during processing of invite request 630. Each of these points of transparency control can have distinct properties that can be used to set transparency control policies that can determine when and/or how transparency controls are imposed on a given message in a session. The internally-based criteria or properties indicated by transparency control policy 644 can be more flexible and specific than those available for transparency control policies 642, 640, respectively related to interface 602 and Peer A 610. Thus, transparency control policy 644 can be implemented with greater granularity than can transparency control policies 642, 640. Peer A 610 provides the next greatest granularity for transparency control in this exemplary embodiment.

The implementation of a transparency control policy such as any of policies 640, 642 or 644 can have the effect of causing certain information in the session message, such as in invite request 630, to be dropped or blocked, modified, or passed to an outgoing interface. The session message information of interest is identified with the transparency types for which a transparency control policy, such as policy 642, is implemented. The session message information can be copied from an incoming message to a newly formed outgoing message to implement a transparent setting, so that the information of interest is unchanged. The session message information can be deleted, or not copied to a newly formed outgoing message to implement a non-transparent setting. In addition, certain session message information can be modified to implement a non-transparent setting that might impact the information of interest, such as by changing an IP address, for example.

Transparency control policy 644 can be implemented in a situation in which there can be a number of sessions that are active from Peer A 610 to interface 602, with each session being managed differently in accordance with transparency control policy 644. For example, transparency control policy 644 can be implemented based on a property of a session, such as the called number, the calling party number originating the session, time of day, or any other session-related property. The provision of transparency control policy 644 in SBC 600 provides a flexible transparency configuration that can be implemented on a session-by-session basis to obtain a significant level of specificity for transparency control in SBC 600. Transparency control policy 644 in SBC 600, in conjunction with properties of Peer A 610 and interface 602, represents a significant improvement over conventional systems, which tended to provide significantly less flexible and typically hard-coded transparency settings that often did not achieve the full extent of transparency control desired.

FIG. 6 represents a conceptual architecture for implementing transparency control with respect to a network node represented as SBC 600. In practice, transparency control policies 640, 642 and 644 may be implemented as a group, with the transparency control settings depending on settings related to Peer A 610, interface 602 and/or dynamic settings implemented in relation to the internal workings of SBC 600. For example, transparency control policies 640, 642 and/or 644 may be implemented with the use of entries in a table that is reviewed for each session that is initiated, processed or terminated at SBC 600. Thus, some entries in such a table may define certain characteristics of Peer A 610 that, upon being matched by the processing operations of SBC 600, implement a specific policy, such as transparency control policy 640. Likewise, entries may be made in such a table to match properties related to interface 602 or policies implemented internally in SBC 600 to implement respective transparency control policies 642, 644. Such policies can be, for example, specific to interface 602 receiving messages from Peer A 610.

Figure 7:
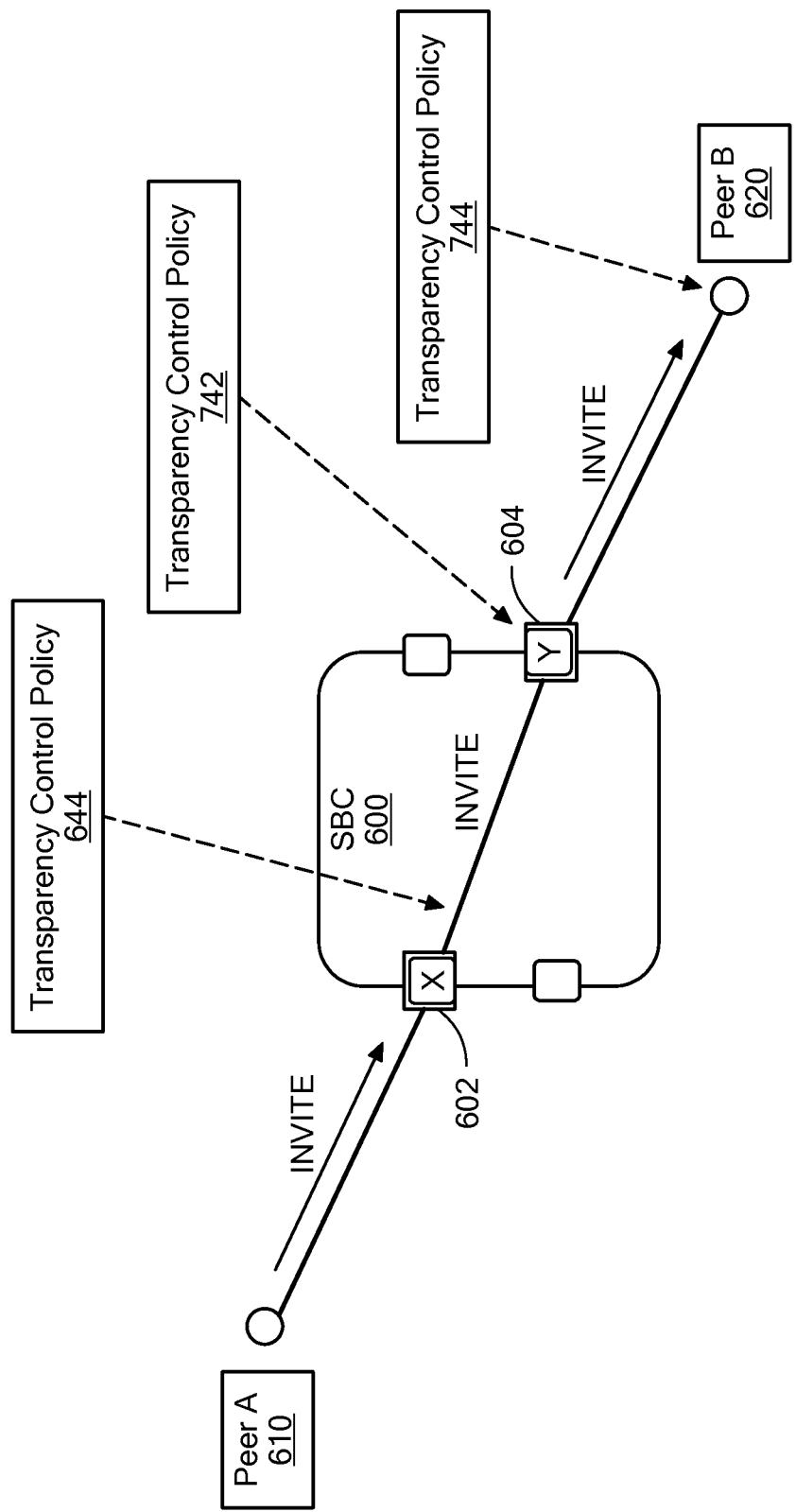

Referring now to FIG. 7, another set of transparency control policies 644, 742 and 744 is illustrated with respect to SBC 600 for messages involved in a same session as that of FIG. 6, but which arrive at an interface 604 as part of a response or a future request. SBC 600 consults transparency control policy 644, 744 or 742 for a given message in a given session that is arriving at interface 604 from Peer B 620. As transparency control policies 644, 742 and 744 illustrate, there are several criteria or properties that can be used to administer transparency control based on Peer B 620, interface 604, or internally in SBC 600. Transparency control policy 644 can be implemented with greater granularity than transparency control policies 742, 744. Peer B 620 provides the next greatest granularity for transparency control in this exemplary embodiment. As with interface 602, some transparency settings may be specified in accordance with the operational definition of interface 604. Such transparency settings may be generalized to the type of protocol or interface used to operate or implement interface 604, such as, for example, to comply with a standard.

Figure 7A:
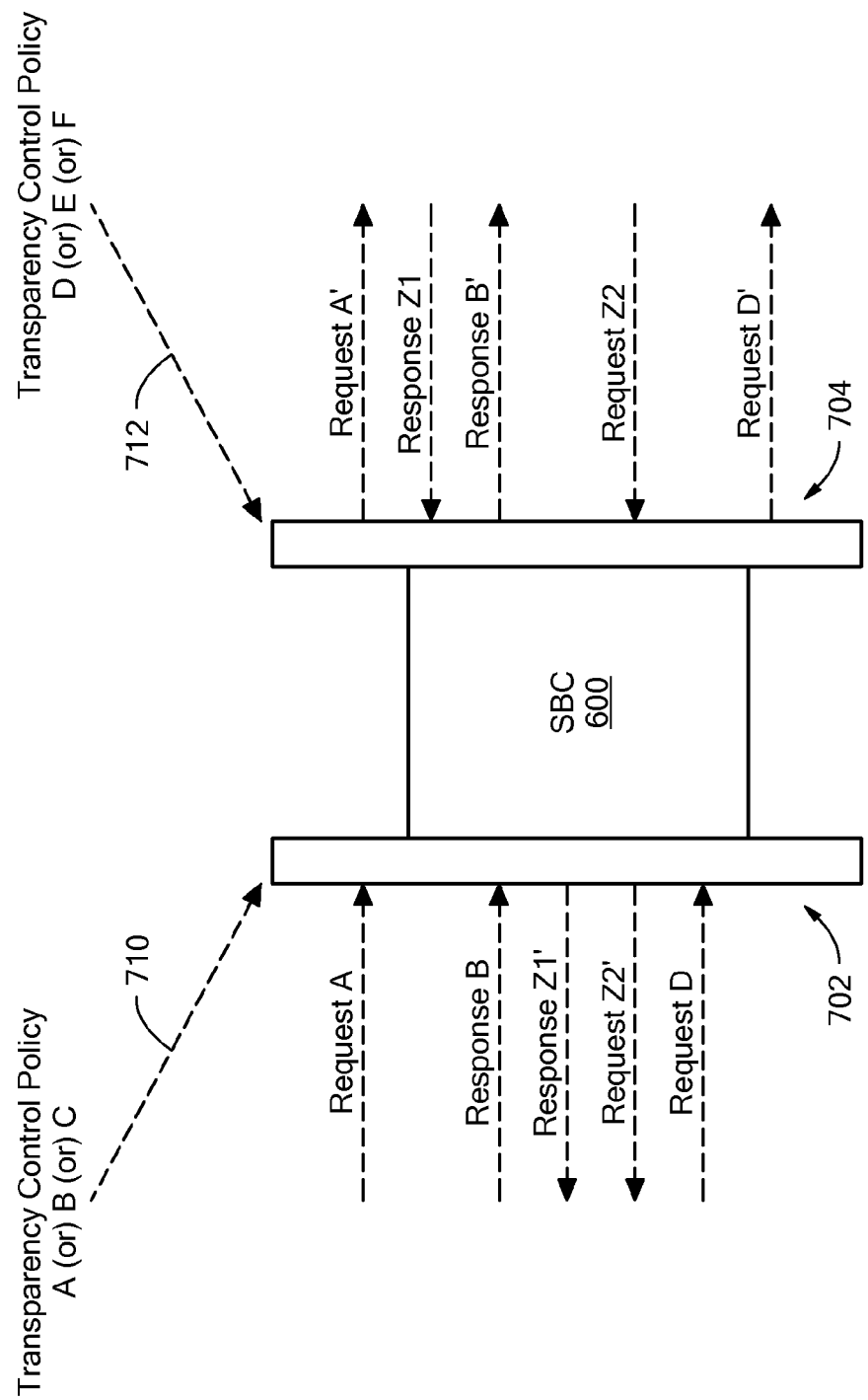
FIG. 7A is a diagram illustrating application of transparency control policies on two sides of a communication component in accordance with an exemplary embodiment of the present disclosure.

Referring to FIG. 7A, a diagram of SBC 600 showing session messages arriving and leaving from two sides 702 and 704 is illustrated. On side 702, incoming messages are processed in accordance with a selected transparency control policy 710, while incoming messages on side 704 are processed in accordance with a selected transparency control policy 712. Transparency control policies 710 and 712 may be selected from respective transparency control policies 640, 642 or 644 (FIG. 6) or transparency control policies 644, 742 or 744 (FIG. 7). Requests and responses denoted as Request A, Response B, Response Z1, Request Z2 and Request D are received at side 702 or 704 of SBC 600, as illustrated in FIG. 7A. Corresponding requests and responses denoted as Request A', Response B', Response Z1', Request Z2' and Request D' are sent out of sides 702 or 704 of SBC 600, as illustrated in FIG. 7A. Request A', Response B', Response Z1', Request Z2' and Request D' illustrate requests and responses that are processed with a transparency control policy such as 710 or 712, in accordance with the direction the request or response is traveling, i.e., on a forward path or reverse path. Depending on the direction of travel, the various requests and responses shown in FIG. 7A may arrive at either interface 602 or 604 (FIGS. 6 and 7), and be processed with a respective transparency control policy 710 or 712.

SBC 600 switches traffic related to access and interconnection across different interfaces that may have different properties. For example, the interfaces, such as interface 602 and 604, may have protocol-specific properties, such as may be related to SIP or H.323, as well as specific IP address and port settings in addition to transport types, such as UDP or TCP. Accordingly, the information related to traffic managed by SBC 600 can be directed to numerous types of traffic, interfaces and routing. Moreover, the present disclosure is directed to transparency control in a network node of a communication network, and as such can be implemented in numerous forms in addition to SBC 600, including a network node in an internet protocol (IP) multimedia subsystem (IMS) network that can implement interconnect border control function (IBCF) and proxy call session control function (P-CSCF). One of the properties or designations that can be utilized by a network node that implements the subject matter of the present disclosure is a level of trust of the network node with respect to peers. For example, in FIGS. 6 and 7, Peer A 610 and Peer B 620 can be assigned various levels of trust, which can be used to influence transparency control policy.

Figures 8, 9:
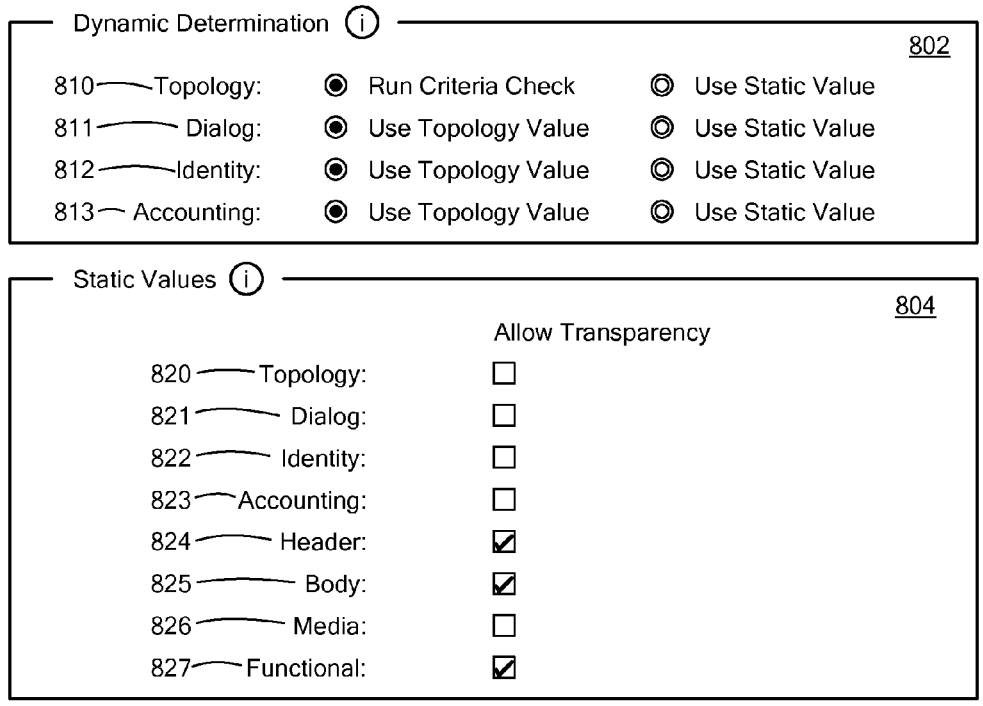
FIG. 8 is a diagram of an exemplary user interface for setting transparency control policies in accordance with an exemplary embodiment of the present disclosure.
FIG. 9 is a table illustrating exemplary transparency control policy settings according to an exemplary embodiment of the present disclosure.

Referring now to FIG. 8, an exemplary embodiment of a user interface 800 for configuring transparency control policy in a given network node is illustrated. User interface 800 is separated into two main categories of dynamic determination 802 and static values 804. Dynamic determination 802 includes radio buttons for selecting either dynamic or static transparency control settings for each of transparency control-related items of topology 810, dialog 811, identity 812 and accounting 813. The radio button used to indicate selection of dynamic transparency control settings for topology 810 has the caption "Run Criteria Check," indicating that the transparency control implemented for topology transparency is determined dynamically on the basis of a criteria check. In the example illustrated in FIG. 8, the radio button selections with the caption "Use Topology Value" for the transparency types of dialog 811, identity 812 and accounting 813 all indicate that the transparency control setting that is dynamically determined for topology transparency should be used. Although dynamic determination 802 illustrates four transparency types topology 810, dialog 811, identity 812 and accounting 813, it should be understood that the number of transparency types that can be used or implemented in realizing user interface 800 and a transparency control can be less than or greater than four without undue experimentation. In addition, the transparency types that can be included in dynamic determination 802 can be other than those shown in FIG. 8. Moreover, the transparency types that can be listed in dynamic determination 802 can be provided with one or more radio button selections, for example, that can be associated with running a criteria check, using the transparency control setting for another transparency type, or combinations thereof. Dynamic determination 802 can thus be implemented to provide a significant amount of flexibility for setting a specified transparency control and/or policy.

Static values 804 includes checkboxes associated with the transparency types of topology 820, dialog 821, identity 822, accounting 823, header 824, body 825, media 826 and functional 827. The status of the checkboxes, i.e., whether checked or unchecked, determines the static transparency control behavior for respective transparency types of topology 820, dialog 821, identity 822, accounting 823, header 824, body 825, media 826 and functional 827. The value of the settings illustrated in FIG. 8 can be set by an operator to implement a desired transparency control behavior that is either dynamic, static, or a combination of both.

One of the key issues in configuring and implementing transparency policies can be the topology of a network that is coupled to the network node of interest. Taking SBC 600 (FIGS. 6, 7) as the network node of interest, the operator may wish to avoid revealing the topology of a network coupled to SBC 600, as the topology of the network may include IP address information that is carried in a signaling message, such as a SIP message, which provides information on the internal structure of the network. It is often desirable to obscure this information from a different or potentially less trustworthy domain when forwarding signaling messages. In some circumstances, however, it is desirable to pass topology information, such as for verification of trusted entities across different network domains. Accordingly, transparency control for topology information is of key interest in implementing a transparency control policy. Thus, according to an exemplary embodiment, transparency control for transparency types other than topology may be made dependent on the transparency control applied for topology.

A transparency policy for the topology of a network coupled to SBC 600, for example, may be a primary consideration for determining an overall policy for transparency of a session, so that other properties related to a given session may be dependent on the transparency setting for topology. However, it should be noted that any type of configuration dependencies can be implemented using the various criteria and properties that may influence, or may be influenced by, transparency issues. For example, a transparency configuration may be implemented in accordance with the present disclosure that refers to a dialog or a session as a primary configuration item upon which the transparency control policy of other transparency types may depend. Accordingly, the configuration dependencies discussed and illustrated with respect to user interface 800 are for illustration of an exemplary embodiment, and the present disclosure is not limited to such an implementation.

User interface 800 provides settings for transparency control that can depend on the transparency control that is implemented for topology. In dynamic determination 802, radio buttons are provided for indicating whether transparency control should be implemented for topology 810 in accordance with static settings or on the basis of dynamic criteria. When the radio button with the caption "Run Criteria Check" associated with topology 810 is selected in dynamic determination 802, the transparency control setting is determined dynamically, for example, on the basis of a route-based value that is used in session messages. Thus, with the "Run Criteria Check" captioned radio button being selected for topology 810, as is illustrated in the example of FIG. 8, additional information is used to make a dynamic determination as to whether topology information is dropped, modified or passed in individual session messages.

When topology 810 has the radio button with the caption "Use Static Value" selected, a dynamic determination for topology transparency control is not made. Rather, the status of the checkbox associated with topology 820 in static values 804 is used to determine whether topology transparency is allowed. Accordingly, when the status of the checkbox associated with topology 820 is used to determine topology transparency control, additional information need not be obtained to determine whether topology information is dropped, modified or passed in individual session messages. Rather, SBC 600 (FIGS. 6, 7) implements topology transparency control in accordance with the status of the checkbox associated with topology 820.

Transparency types of dialog 811, identity 812 and accounting 813 in dynamic determination 802 have an associated radio button with the caption "Use Topology Value." In the example illustrated in FIG. 8, the transparency control behavior that is determined for topology 810 is used to implement transparency control for any of the transparency types of dialog 811, identity 812 or accounting 813, when those transparency types have their associated radio button with the caption "Use Topology Value" selected. Thus, transparency control for the transparency types of dialog 811, identity 812 or accounting 813 can be determined dynamically when the radio button with the caption "Run Criteria Check" associated with topology 810 is selected in dynamic determination 802. Alternately, the radio button with the caption "Use Static Value" associated with topology 810 may be selected, so that transparency control for the transparency types of dialog 811, identity 812 or accounting 813 that have the radio button selected with the caption "Use Topology Value" is determined based on the status of the checkbox associated with topology 820 in static values 804. With these various settings, the transparency types of dialog 811, identity 812 or accounting 813 can be made dependent on the transparency control behavior for the topology, whether that behavior is determined on a dynamic or static basis.

When any of the radio buttons that are captioned "Use Static Value" are selected for topology 810, dialog 811, identity 812 or accounting 813, the transparency control setting is determined by a corresponding checkbox status in static values 804. Thus, the checkbox status of topology 820, dialog 821, identity 822 and accounting 823 in static values 804 can be used to determine whether transparency control is enabled or disabled, based on a selection of the respective "Use Static Value" captioned radio button for any of topology 810, dialog 811, identity 812 or accounting 813 in dynamic determination 802. In addition, the example illustrated in FIG. 8 permits static transparency control to be enabled or disabled based on a checkbox status associated with each of the transparency types of header 824, body 825, media 826 and functional 827. In the example of FIG. 8, static transparency control is enabled for header 824, body 825 and functional 827, while being disabled for media 826.

The above-discussed combination of choices for determining how transparency control is to be implemented for each of the transparency types provides a flexible and detailed level of transparency control for each of the transparency types to permit an operator to tailor transparency control as desired. The operator can rely on static values for implementing transparency control, or can use static and/or dynamic transparency control in various combinations to achieve a flexible transparency control policy for the various transparency types. When using dynamic transparency control, additional information, such as conditions for determining whether transparency is to be enabled or disabled, may be specified by the operator in a logical construct, such as a table.

Referring to FIG. 9, an exemplary embodiment of some of the information that may be used to dynamically determine topology transparency control is shown in table 900. Table 900 includes four columns 910, 911, 912 and 913 in this example, each of which columns relate to properties of the session for which transparency settings are to be determined. Column 910 permits entries that describe the message ingress interface network type, which can indicate the type of interface through which a message is received on the network node. Column 911 permits entries that describe a message egress network type, which can indicate the type of interface from which the session message exits the network node. Column 912 permits entries that describe the message egress peer trust level, which can be matched with message related criteria to contribute to determining whether topology information should be dropped, modified or passed. Column 913 permits entries that can indicate the resulting settings for topology transparency for the given set of circumstances described in columns 910, 911 and 912 for a given row of table 900.

Table 900 includes four rows 920, 921, 922 and 923 in the example illustrated in FIG. 9, each of which rows represent specific conditions for determining transparency settings for the topology transparency type, as listed in column 913. When, as is exemplarily shown in FIG. 8, the radio button with the "Run Criteria Check" caption is selected for topology 810 (FIG. 8), the topology transparency control is determined on a dynamic basis. Rows 920, 921 and 922 of table 900 represent different combinations of criteria for dynamically determining a transparency setting for the topology transparency type. For example, topology transparency is disabled in accordance with the conditions listed in row 920 when the message ingress interface network type is "Local" and the message egress interface network type is "Interconnect." Note that the entry in row 920 for column 912 is set to "Not Applicable" ("N/A"), indicating that the value of the parameters associated with message egress peer trust level do not contribute to determining topology transparency in this specific case.

If the conditions determined for a given session do not match any of those listed in rows 920, 921 or 922, the result listed in row 923 is used to determine topology transparency in this case. Since the entries in row 923 under columns 910, 911 and 912 have a value of "Any," row 923 forms a default value for the topology transparency setting, which value is indicated in row 923 at column 913. The entry in row 923 at column 913 indicates that the static value setting for topology transparency should be used. In accordance with the example illustrated in FIGS. 8 and 9, the static setting that is to be used for topology transparency control is indicated by the status of the checkbox associated with topology 820 in static values 804 of user interface 800. The checkbox associated with topology 820 is unchecked, indicating that transparency is not allowed, so that topology information is dropped or obscured from a message when the static values are used.

Figure 10:
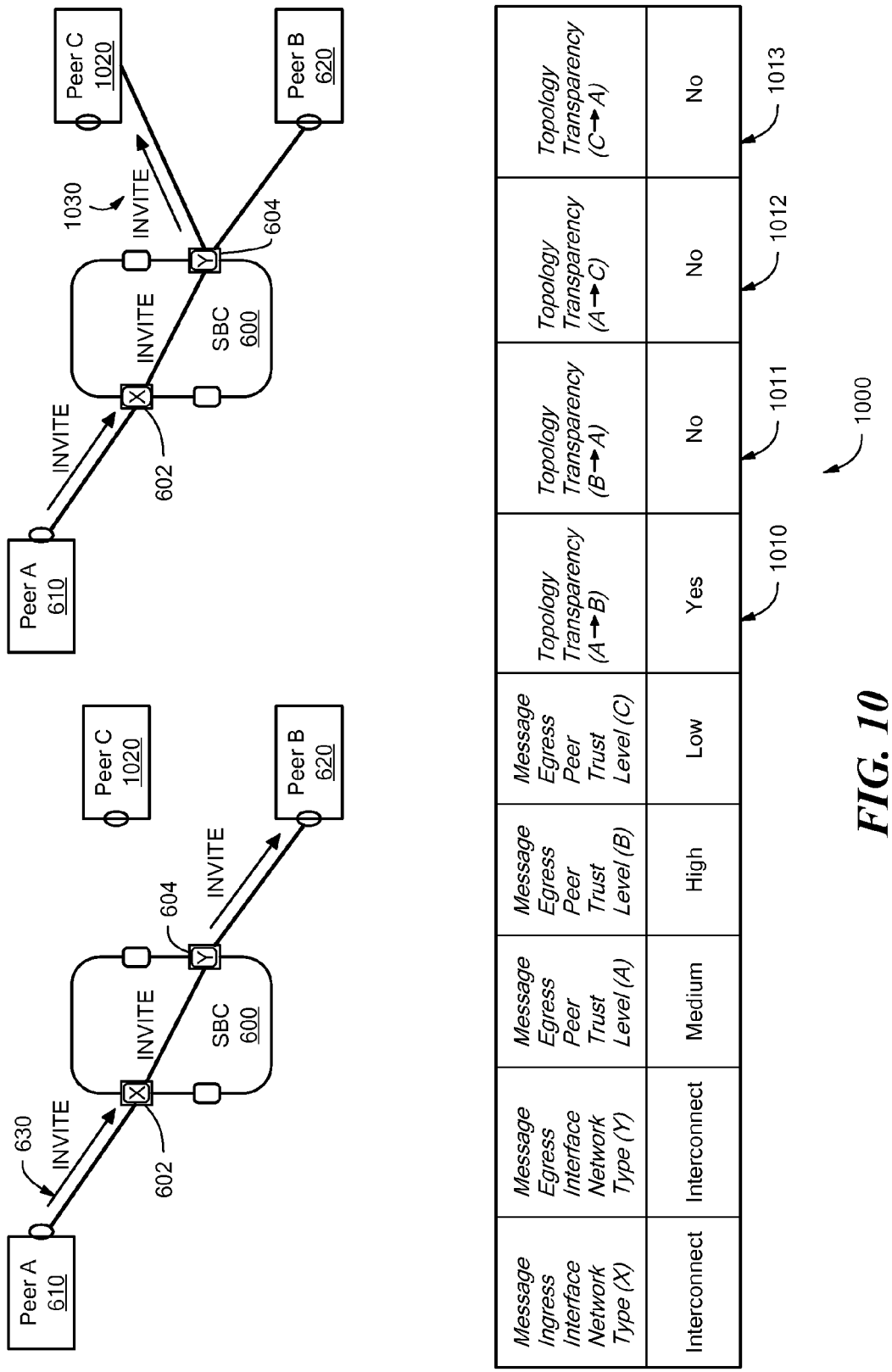
FIG. 10 is a diagram according to an exemplary embodiment of the present disclosure showing the configuration and operation of transparency control policies during a rerouting event in which a new route is attempted in a session and transparency control policies are recomputed.

Referring now to FIG. 10, an exemplary embodiment of the present disclosure illustrates how the dynamic nature of the transparency control policies can beneficially serve to achieve a desired level of specificity for an operator, without incurring conflicts or undesired transparency settings that might be hard-coded to achieve a certain desired result on the part of the operator. Table 1000 in FIG. 10 illustrates a set of topology transparency settings for a group of peers potentially coupled to SBC 600 (FIG. 6). In FIG. 10, a scenario in which an invite request 630 provided by Peer A 610 is rerouted to a Peer C 1020 instead of Peer B 620 is illustrated. Rerouted invite request 1030, which is routed to Peer C 1020, is processed in accordance with transparency settings that are recalculated in SBC 600 when invite request 1030 is rerouted to Peer C 1020. The recomputed transparency values are determined based on criteria or properties that may be related to one or more of Peer A 610, ingress interface 602, internal settings for SBC 600, egress interface 604 and Peer C 1020.

In table 1000, the topology transparency value for messages from Peer A 610 to Peer B 620 is "Yes" as indicated in entry 1010. However, a topology transparency for messages from Peer A 610 to Peer C 1020 is "No" as indicated in entry 1012. In addition, the topology transparency value for messages from Peer B 620 to Peer A 610 is set to "No" as indicated in entry 1011. The topology transparency value for messages from Peer C 1020 to Peer A 610 is also "No" as indicated in entry 1013. Accordingly, when invite request 630 is rerouted as invite request 1030 to Peer C 1020, the topology transparency is indicated as "No" as provided in entry 1012, even though the initial topology transparency for invite request 630 traveling from Peer A 610 to Peer B 620 was "Yes" as indicated in entry 1010. Thus, upon a message being rerouted by SBC 600, transparency related settings are recalculated to determine the appropriate transparency settings based on entries such as are provided in table 1000. In this way, the operator is beneficially provided with significant flexibility in setting transparency based on a variety of criteria, in a specific manner to create the desired transparency result in accordance with the present disclosure. The ability to configure a transparency policy in such a flexible manner with such specific criteria represents a significant improvement over conventional systems in which the operator is left to configure transparency based on a limited number of criteria, that would be static, or otherwise hard-coded for specific cases, leading to operational complexities, as well as failing to provide a desired result sought by the operator. Conventional systems do not offer mechanisms with criteria dependency or dynamic route dependencies, and are typically limited to unconditional hiding or transparency control that is specific to certain information like topology due to the SBC being modeled as a B2BUA. The facility provided by the present disclosure of selecting between dynamic determinations of transparency in conjunction with static settings permits the operator to obtain a robust and detailed transparency policy for message traffic carried by the network node of interest.

The transparency control policies discussed above permit a given network node carrying signaling messages to operate in accordance with prescribed behavior. For example, the network node can be configured to operate as a purely transparent B2BUA, so as to achieve a proxy-like behavior. In addition, each of the parameters provided in FIG. 8 can be configured to have default values, where the illustrated parameters, as well as other properties, can be reset to a default value. It should be noted that the criteria for transparency control need not be evaluated on a message or session basis, but can be determined based on a given dialog for dynamic and/or static configurations and applied to incoming messages for that dialog.

Various profiles can be established for peers, interfaces, sessions and/or dialogs. For example, an ingress dialog may include a media profile that provides property settings for media processing. One such property setting can be "intercept media," which can have an attribute of "Yes" or "No." In a case where topology hiding is set to "Yes" but the "intercept media" property is set to "No," the session is rejected with a specific internal cause code. The intercept media settings can be important for media transfer transparency, as well as for employing a codec on the media for further transfer in the network. The media intercept setting can remain constant throughout a session, even if a rerouting attempt is made that incurs different topology transparency settings.

With respect to the transparency type of dialog, the information that can be dropped or passed can be a call-ID. If the dialog transparency type is set to be transparent, the call-ID can be copied from one dialog to another, for example. With transparency disabled, a new call-ID is generated for a separate dialog in accordance with the transparency setting, for example. The dialog transparency type can be recomputed in a rerouting attempt, so that its transparency setting can potentially be modified during a session.

The identity transparency type can be associated with information in a FROM header in an initial request message, as well as other headers related to identity in later responses. The transparency settings for the identity type can be recomputed when topology transparency settings are recomputed in a reroute attempt. The identity information associated with a FROM header in a message session also can be established in privacy headers so that the information content remains hidden.

With regard to the header transparency type, the transparency settings can be recomputed with a reroute attempt occurring during the relevant session. By setting header transparency to "Yes" the result of passing all headers does not necessarily follow, since headers that include topology information are processed for topology transparency as per the relevant settings for that type. With respect to body transparency type, various behaviors can be implemented in accordance with such functions as a proxy or fully transparent B2BUA. Some body specific transparency settings may be implemented to handle specific contents of the message body, such as decoding and encoding of ISUP or other content types, such as QSIG, simple message summary and other mime types.

As an example of an implementation involving body transparency, if transparency is on, and an incoming invite request has an SDP and ISUP-IAM, when the media is intercepted, the SDP is modified, whereas the ISUP-IAM is retained and sent out with the modified SDP. The same is true in response, such as may be provided with a "200 OK INVITE" response that has SDP and ISUP-ANM. The bodies may be kept independent such that even when SDP is not passed, the body can still be passed. For example, an incoming "200 OK INVITE" response with SDP and ISUP-ANM may have the SDP dropped to permit the message to pass, but still retain the ISUP-ANM. When this transparency is off, the SDP is sent alone in the message, regardless of whether it was modified.

With respect to media interception, a media profile may be provided that includes properties for processing media. Such a profile is separate from transparency control settings for processing messages with media content in a session. If transparency is selected for processing media in a session, the media behavior is unchanged with respect to transparency, so that the media profile properties are used to process the media as desired. For example, media transparency being set to "Yes" indicates that SDP information may be passed unmodified. In the case of media interception for media monitoring or topology hiding, or other reasons, the SDP may be modified, including in instances where filtering or reordering codecs are applied. In the case where media transparency is set to "No", the media is intercepted, which can be due to the settings applied for topology transparency. In the case where media is not intercepted when media transparency is set to "No," such a session is rejected, with a corresponding internal cause code being annunciated. Table 1100 in FIG. 11 illustrates media interception conditions and configuration in relation to transparency control policy.

With respect to security transparency, messages that include information related to authorization, authentication or end-to-end security may be transparently passed through the given network node of interest. While transparency can be controlled for security-related information in a session, so that security information can be passed or blocked, security information may be passed in a general mode of operation, since blocking such information may obstruct the intended goal of providing security for session messages. As network security develops, it may be desirable to rely on authorization or authentication between communication network domains, which can be implemented with the facility to control security transparency in accordance with the present disclosure.

With respect to accounting transparency, information related to recording, billing, usage tracking and other accounting related information may be blocked or passed in accordance with the transparency control policy. In general, it can be considered desirable to maintain transparency for accounting information, since such information generally traverses a number of entities and thus is considered useful to preserve. However, the facility for controlling transparency of accounting information permits the information to be controlled across communication network domains for implementation of specific accounting behavior.

With respect to functional transparency, sometimes referred to as feature transparency, transparency is achieved with indistinguishable functional behavior across the network node. That is, information should pass across the node without distorting the intended effect of the functionality. Functional transparency may implicate a number of operational activities of the node to be properly achieved. With respect to transparency behavior, the desired results may be achievable for trusted remote entities, where certain protocol rules are disabled for the sessions of interest. This transparency type may include additional settings for describing behavior of operational activities in the node to better achieve functional transparency when desired, such as by disabling some protocol security rules in such a session, or supporting methods such as SUBSCRIBE or MESSAGE.

When topology transparency is set to "Yes" the VIA headers in the message are passed through the network node. For example, for an invite request passing from an interconnect interface to a local interface, all the VIA headers are passed to the local network, which behavior also applies to further messages such as an ACK or re-invite message. When topology transparency is set to "No," the VIA headers in an incoming message are dropped, and can be stored at the network node, such that the outgoing invite message has a single VIA header that refers to the outgoing interface. Upon receiving a response to this outgoing invite request, the network node can retrieve the stored VIA headers and provide them with the outgoing response message.

With respect to identity transparency, information in a FROM header is copied from an incoming initial invite message to an outgoing invite message when identity transparency is set to "Yes." With identity transparency set to "No," the user part of the outgoing invite message is created without user part information. With the formation of a new FROM header related to an incoming invite message used to generate an outgoing invite message, the host domain, IP or port is copied from the incoming invite message FROM header when topology transparency is set to "Yes." With topology transparency set to "No," a new host part is created with the interface domain or the IP address and port of the interface from which the invite message is being sent out. When an initial outgoing invite message is formed based on an incoming invite message, a new TO header is created which is copied from the incoming TO header of the invite message, regardless of identity transparency settings. However, configuration settings can be provided to modify the behavior of the TO header in the outgoing invite message in accordance with desired transparency behavior.

With respect to topology transparency, in the case of the CONTACT header, with topology transparency set to "Yes," the CONTACT header formed in a dialog on one side of a network node can be copied to a customized header in the message in the other dialog on the other side of the network node. For example, an incoming initial invite message on an interconnect interface that is being sent out of a local interface has the CONTACT header of the incoming invite message copied to a custom header in the outgoing invite message in the local network. In the case where identity transparency is set to "Yes," for an incoming message, the user part including display information is copied to the outgoing message.

When message information is not blocked or removed in an outgoing message, due to transparency control policy settings, or other reasons, such as profile settings, it is not necessary to cache the past information for use in the session of interest. This convention can be used to help optimize memory usage by reducing processing cycles used for caching or mirroring.

Topology transparency being set to "No" may cause the history-info header to be removed from outgoing messages being forwarded to remote networks. In addition, the remote-party-ID may be removed from messages prior to the message being forwarded, and may optionally be cached for further use in the session. In the case where an SIP message is being sent with an SDP payload, the IP address is modified to that of the SIP interface from which the message is being sent. This behavior for topology hiding obscures the owner line of the SDP payload, and may cause a content length calculation to be recomputed for the SDP payload.

Figure 12:
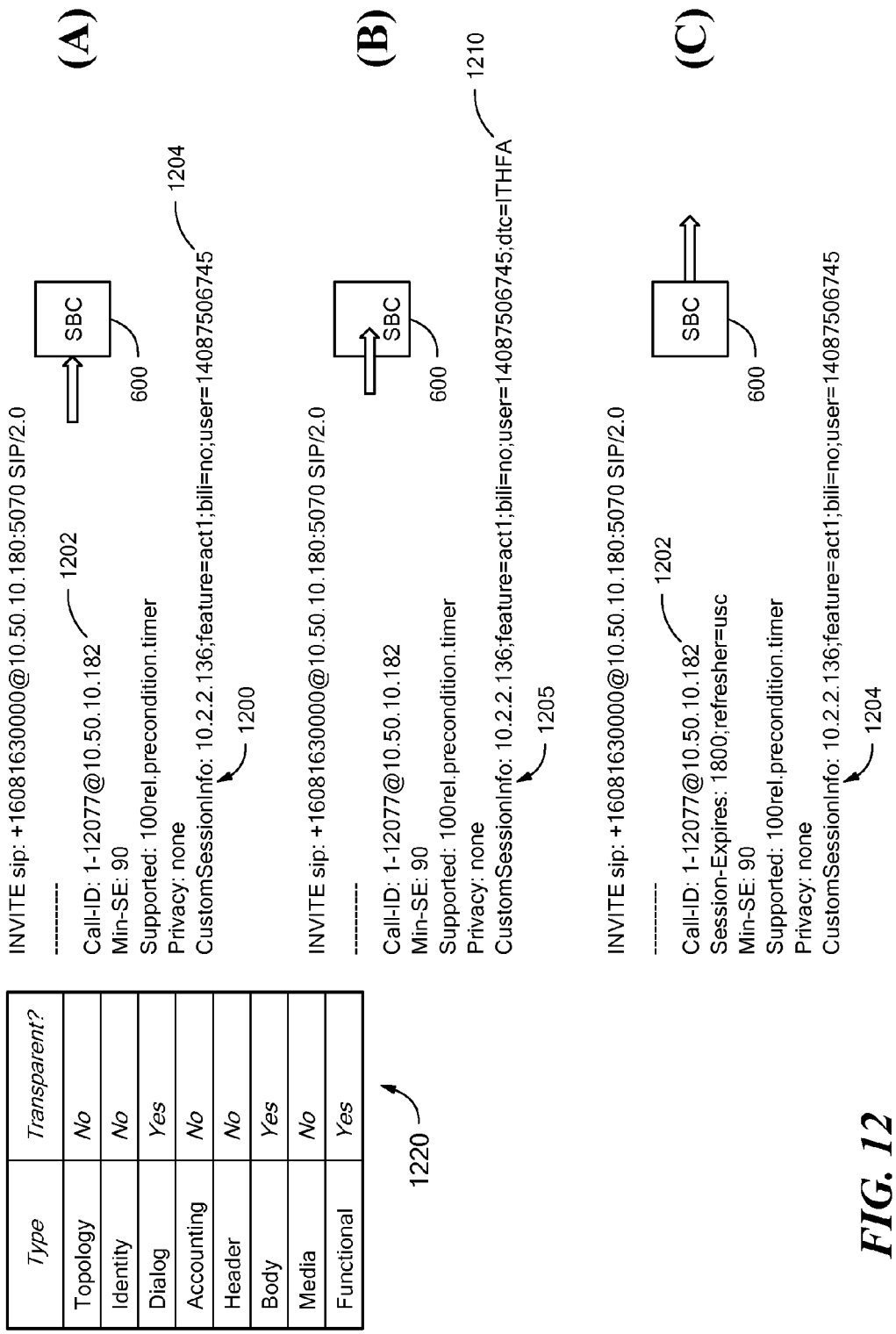
FIGS. 12-14 are diagrams illustrating the application of transparency control settings that use a marking feature that indicates the transparency types associated with message information according to an exemplary embodiment of the present disclosure.

Referring now to FIG. 12, an exemplary embodiment of the present disclosure is illustrated for providing a session message with specific values associated with the different transparency types. In accordance with this exemplary embodiment, the network node includes a mechanism for modifying the session message being processed to indicate transparency types. The mechanism for modifying a session message being processed can be realized by one of ordinary skill in the art without undue experimentation. In accordance with an exemplary embodiment of the present disclosure, the transparency types of topology, identity, accounting, header and functional can be identified with markings applied to the incoming message in the form of respective initial letters T, I, A, H and F. For example, SBC 600 can implement a mechanism to inspect the version of incoming SIP message 1200 illustrated in sequence (A) of FIG. 12 and determine that the message information may implicate transparency types identity, topology, header, functional and accounting, and thus append the respective letters to custom header 1205 in the form of marking 1210. FIG. 12 illustrates this exemplary marking configuration with the addition of marking 1210 "dtc=ITHFA" in the custom session info identifier in the version of SIP message 1200 shown in sequence (B).

Table 1220 in FIG. 12 illustrates a listing of final values for the pertinent transparency types related to SIP message 1200 being processed. SIP message 1200 includes a call-ID 1202 and a custom header 1204. SIP message 1200 is processed by SBC 600 to modify custom header 1204 to produce custom header 1205 with marking 1210. Each of the letters in the marking 1210 following "dtc=" represents a transparency type listed in table 1220. The content of marking 1210, "ITHFA," thus identifies corresponding transparency types identity, topology, header, functional and accounting listed in table 1220. With respect to the identity transparency type represented by "I" in marking 1210, the transparency setting in table 1220 is "No," meaning that identity information should not be transparent across SBC 600. Based on this setting, customer header 1204 is dropped, as indicated in the version of SIP message 1200 in sequence (C) being sent out of SBC 600. Because the identify transparency type has a setting of "No," other transparency types identified in marking 1210 may not be evaluated, since the identify transparency type setting obviates the settings of the other transparency types listed in marking 1210.

Because the dialog transparency type is set to "Yes," call-ID 1202 is permitted to pass through SBC 600, as indicated in version (C) of SIP message 1200 leaving SBC 600. This transparency behavior is implemented even though the setting for the topology transparency type is "No," so as to permit the option of call-ID 1202 being passed even when topology is hidden. This flexibility with detailed specifics of transparency control offers a significant improvement over conventional systems, which would have dropped call-ID 1202 with topology hiding being active. The specific example of passing call-ID 1202 by SBC 600 based on the implemented transparency control policy addresses a need felt by operators to deliver call-ID information in cases where it is desired to hide topology information.

Figure 13:
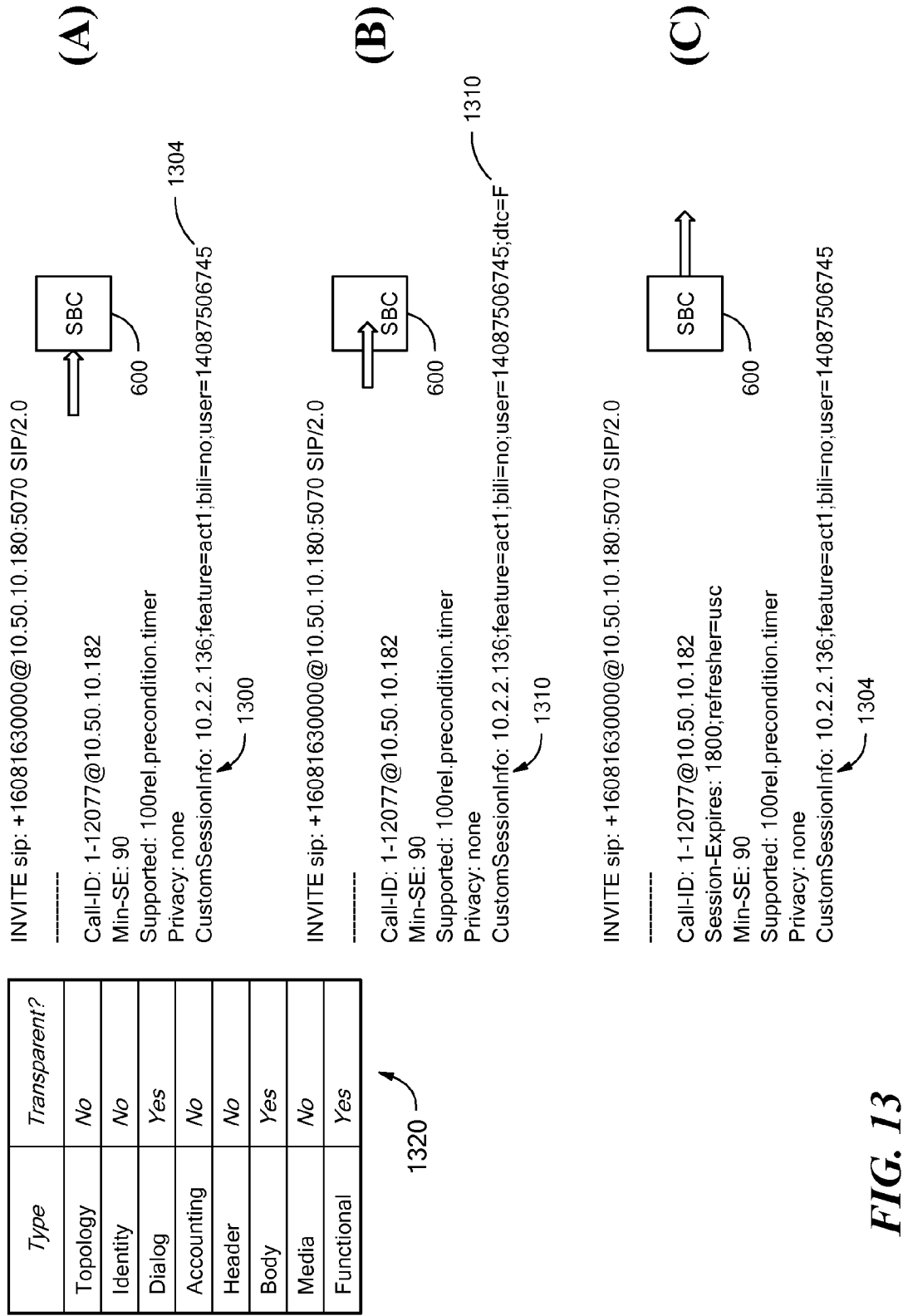

Referring now to FIG. 13, another exemplary embodiment of the present disclosure is illustrated, with marking being used to implement transparency control policies. In FIG. 13, a version of a message 1300 is received by SBC 600 as indicated in sequence (A). Message 1300 is provided with marking 1310 to indicate the functional transparency type with the letter "F," as indicated in the version of message 1300 shown in sequence (B). Internal mechanisms of SBC 600, such as may be implemented with scripts or interpreters without undue experimentation, interpret marking 1310 and inspect table 1320 to determine the transparency setting for the functional transparency type. In this instance, table 1320 shows a setting of "Yes" for the functional transparency type. Accordingly, customer header 1304 is passed by SBC 600 in an outgoing message, as indicated in the version of message 1300 in sequence (C). Since marking 1310 is provided with no letters other than "F", which indicates that functional transparency being enabled, the information in custom header 1304 is passed, even though custom header 1304 includes topology information and the topology transparency type has a setting of "No." The resulting transparency, or passing of custom header 1304, illustrates the flexibility available to the operator to pass session information that would otherwise be blocked in a conventional system.

Figure 14:
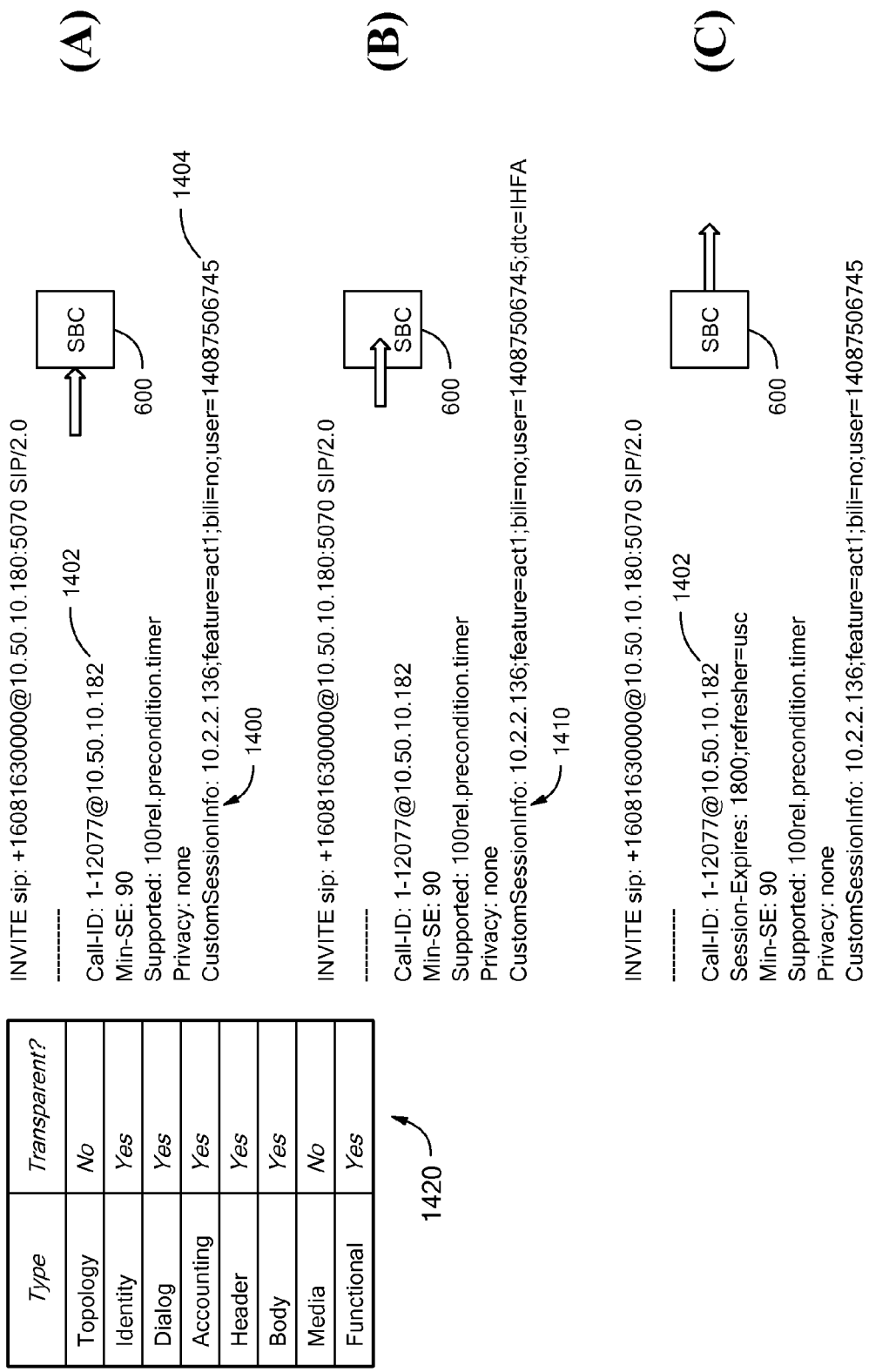

Referring now to FIG. 14, custom header 1404 in a version of a message 1400 shown in sequence (A) is marked with marking 1410 as shown in sequence (B) to indicate a transparency control policy for message 1400. When SBC 600 interprets marking 1410, the identity, header, functional and accounting transparency types are identified for transparency control. SBC 600 inspects table 1420 to determine the transparency settings for the identified transparency types, resulting in the identified transparency types indicating a setting of "Yes." Thus, the session information indicated by the identified transparency types is passed, including call-ID 1402, even though the topology transparency type has a setting of "No." The version of message 1400 shown in sequence (C) illustrates the information related to the identity, header, functional and accounting transparency types being passed by SBC 600.

Figure 15:
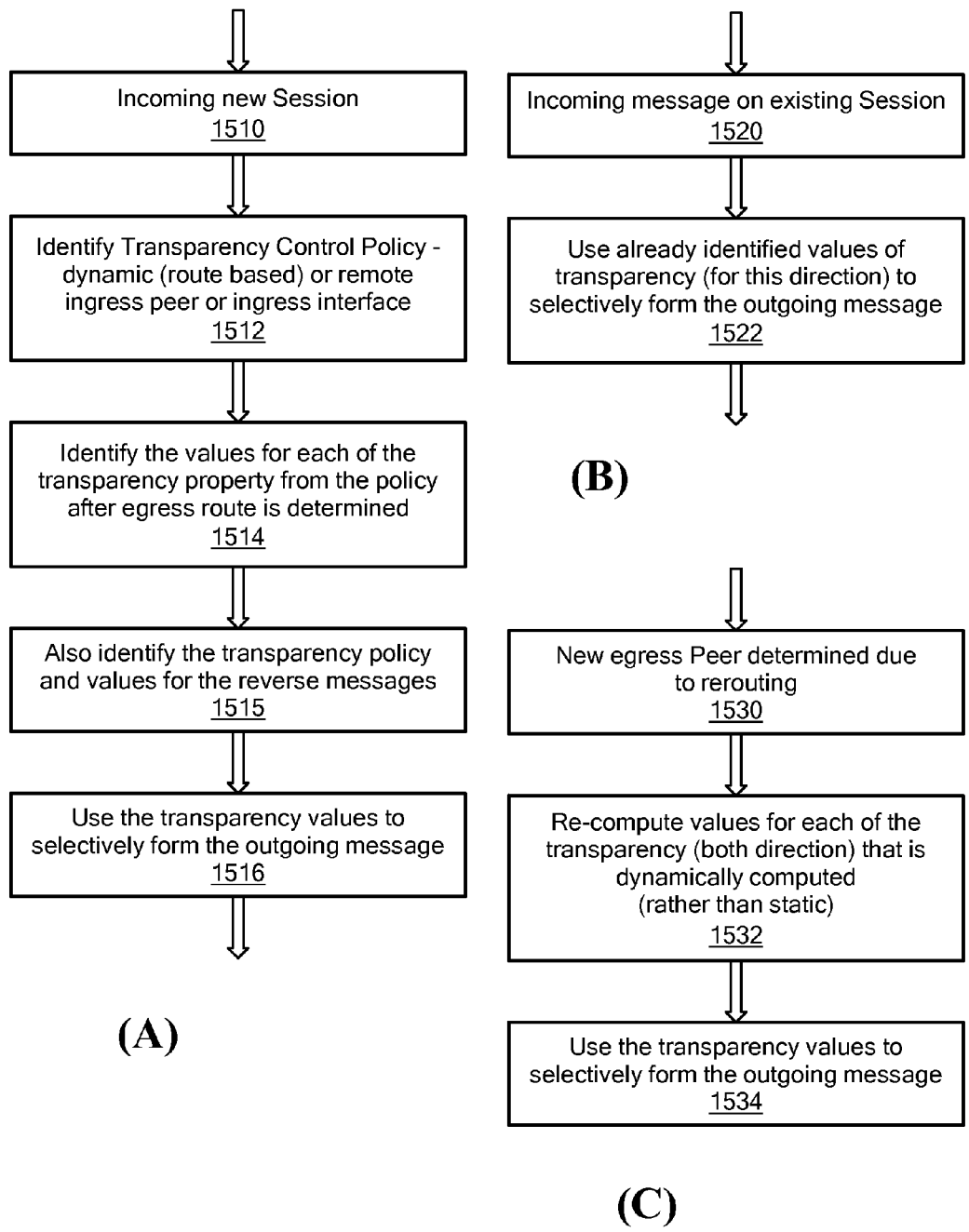
FIG. 15 is a set of flow charts according to an exemplary embodiment of the present disclosure illustrating applied transparency control during different portions of a communication session including a scenario in which a new route is attempted and transparency control policies are recomputed.

Referring now to FIG. 15, flowchart sections (A), (B) and (C) are illustrated for an exemplary embodiment of the present disclosure. With the receipt of an incoming new session, as illustrated in block 1510, a transparency control policy is identified that can be dynamic, i.e., route based, or based on a remote ingress peer setting or an ingress interface setting, as indicated in block 1512. For the identified transparency control policy, the values of each transparency type can be evaluated to obtain a desired transparency property, as illustrated in block 1514. The value of the transparency types can be evaluated after an egress route is determined for the incoming session message, as shown in block 1514. The process can also identify a transparency control policy for reverse messages/responses, as illustrated in block 1515. The transparency control policy for the reverse messages can also be dynamic, i.e., route based, or based on the remote ingress peer or ingress interface from the perspective of the reverse message or response. The determined transparency values for the incoming session message are applied to form an outgoing message, which may have information blocked or passed in accordance with the determined transparency settings, as illustrated in block 1516. Once a new session is established, flowchart section (B) illustrates processing of incoming messages for an existing session, as indicated in block 1520. Since the transparency settings for both directions are established for the existing session, those values are used to form the outgoing message where information in the message is blocked or passed in accordance with the transparency settings, as indicated in block 1522.

In flowchart section (C), the situation where a new egress peer becomes involved in the session is illustrated. The new egress peer can be determined based on rerouting activity, as indicated in block 1530. The transparency process recomputes the transparency values in both directions of the session that are indicated to be dynamically set, as indicated in block 1532. Transparency values that are indicated as static are not recomputed when a rerouting event occurs in accordance with this exemplary embodiment. Once the dynamic transparency values are recomputed, they are used to form the outgoing message with specified information being blocked or passed in accordance with the recomputed transparency settings, as indicated in block 1534.

The present disclosure thus beneficially provides flexible and specific options for setting transparency behavior in a communication network node based on dynamic and/or static parameters and properties involved in a given session. The present disclosure thus beneficially permits operators to specify particular transparency overrides on a dynamic basis to meet the needs of network domain communication security and functionality. In addition, modifications within a given session, such as may occur with a rerouting event to a new peer and/or interface can be accommodated by permitting transparency values to be recomputed for the new peer and/or interface. With the present disclosure, transparency control policies can be based on a carrier-peer relationship for session messages that pass in either direction, thereby permitting additional flexibility in specifying transparency behavior.

The operations herein depicted and/or described herein are purely exemplary and imply no particular order. Further, the operations can be used in any sequence when appropriate and can be partially used. With the above embodiments in mind, it should be understood that they can employ various computer-implemented operations involving data transferred or stored in computer systems. These operations are those requiring physical manipulation of physical quantities. Usually, though not necessarily, these quantities take the form of electrical, magnetic, or optical signals capable of being stored, transferred, combined, compared and otherwise manipulated.

Any of the operations depicted and/or described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines employing one or more processors coupled to one or more computer readable medium, described below, can be used with computer programs written in accordance with the teachings herein, or it may be more convenient to construct a more specialized apparatus to perform the required operations.

The disclosed systems and methods can also be embodied as computer readable code on a computer readable medium.

The computer readable medium is any data storage device that can store data, which can be thereafter be read by a computer system. Examples of the computer readable medium include hard drives, read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion.

The foregoing description has been directed to particular embodiments of this disclosure. It will be apparent, however, that other variations and modifications may be made to the described embodiments, with the attainment of some or all of their advantages. The procedures, processes and/or modules described herein may be implemented in hardware, software, embodied as a computer-readable medium having program instructions, firmware, or a combination thereof. For example, the function described herein may be performed by a processor executing program instructions out of a memory or other storage device. Therefore, it is the object of the appended claims to cover all such variations and modifications as come within the true spirit and scope of the disclosure.

What is claimed is:

1. A computer implemented method of establishing transparency control for information in a session message at a communication network node, comprising:
    defining, for each of a plurality of transparency types, a transparency behavior of operational activities in the communication network node;
    receiving, at the communication network node from a first communication network peer, an incoming session message that includes one or more session message properties;
    selecting, by a user interface at the communication network node, user selectable settings relating to one or more of a dynamic transparency behavior and a static transparency behavior of the operational activities in the communication network node;
    evaluating, by the communication network node, the user selectable settings to at least partially determine the transparency behavior associated with one or more of the plurality of transparency types;
    deriving, by the communication network node, an outgoing session message to be sent to a second communication network peer, the outgoing session message being derived at least in part by applying the transparency behavior associated with one or more of the plurality of transparency types to the incoming session message; and
    sending the outgoing session message from the communication network node to the second communication network peer.

2. The method according to claim 1, further comprising:
    determining the transparency behavior in accordance with one or more of a peer configuration, an interface configuration or a transparency control policy established in the communication network node.

3. The method according to claim 1, further comprising:
    evaluating, by the communication network node, at least one criterion related to at least a first transparency type to determine the transparency behavior associated with the first transparency type based on the evaluation of the user selectable settings indicating the dynamic transparency behavior.

4. The method according to claim 3, further comprising:
    evaluating the at least one criterion after the session message is rerouted to one or more of a new peer or interface to determine a first new transparency behavior associated with the first transparency type in relation to the new peer or interface.

5. The method according to claim 4, further comprising:
    evaluating a least another criterion related to at least a second transparency type that is in a dependent relationship with the first transparency type to determine a second new transparency behavior associate with the second transparency type in relation to the new peer or interface.

6. The method according to claim 1, wherein the plurality of transparency types includes two or more of topology, dialog, identity, header, body, media, accounting, or functional.

7. The method according to claim 1, further comprising:
    inserting at least one flag in the session message to identify at least one of the transparency types for which the associated transparency behavior is to be applied.

8. The method according to claim 3, further comprising:
    evaluating one or more of an interface type or a trust level to determine the transparency behavior.

9. A device implementing a network node in a communication network that is operable to establish transparency control for information in a session message processed by the device, comprising:
    a processor operable to execute instructions to:
        define, for each of a plurality of transparency types, a transparency behavior of operational activities in the network node;
        receive, from a first communication network peer, an incoming session message that includes one or more session message properties;
        select, by a user interface at the network node, user selectable settings relating to one or more of a dynamic transparency behavior and a static transparency behavior of the operational activities in the network node;
        evaluate the user selectable settings to at least partially determine the transparency behavior associated with one or more of the plurality of transparency types;
        derive an outgoing session message to be sent to a second communication network peer, the outgoing session message being derived at least in part by applying the transparency behavior associated with one or more of the plurality of transparency types to the incoming session message; and
        send the outgoing session message from the communication network node to the second communication network peer.

10. The device according to claim 9, wherein the processor is further operable to:
    determine the transparency behavior in accordance with one or more of a peer configuration, an interface configuration or a transparency control policy established in the communication network node.

11. The device according to claim 9, wherein the processor is further operable to:
    evaluate at least one criterion related to at least a first transparency type to determine the transparency behavior associated with the first transparency type based on the evaluation of the user selectable settings indicating the dynamic transparency behavior.

12. The device according to claim 11, wherein the processor is further operable to:

evaluate the at least one criterion after the session message is rerouted to one or more of a new peer or interface to determine a first new transparency behavior associated with the first transparency type in relation to the new peer or interface.

13. The device according to claim 12, wherein the processor is further operable to:
   evaluate a least another criterion related to at least a second transparency type that is in a dependent relationship with the first transparency type to determine a second new transparency behavior associate with the second transparency type in relation to the new peer or interface.

14. The device according to claim 9, wherein the plurality of transparency types includes two or more of topology, dialog, identity, header, body, media, accounting, or functional.

15. The device according to claim 9, wherein the processor is further operable to:
   insert at least one flag in the session message to identify at least one of the transparency types for which the associated transparency behavior is to be applied.

16. The device according to claim 11, wherein the processor is further operable to:
   evaluate one or more of an interface type or a trust level to determine the transparency behavior.

17. A computer implemented method of establishing transparency control for session information at a communication network node, comprising:
   defining a transparency behavior of operational activities in the communication network node, the transparency behavior being defined for each of a plurality of transparency types in at least one of a plurality of subsets of transparency behavior types;
   identifying at least one criterion associated with a current session;
   identifying at least one transparency behavior in at least one of the subsets in accordance with the at least one criterion;
   receiving, at the communication network node from a first communication network peer, an incoming session message that is associated with the at least one criterion;
   selecting, by a user interface at the communication network node, user selectable settings relating to one or more of a dynamic transparency behavior and a static transparency behavior of the operational activities in the communication network node;
   evaluating, by the communication network node, the user selectable settings to at least partially determine the transparency behavior associated with one or more of the plurality of transparency types;
   deriving, by the communication network node, an outgoing session message to be sent to a second communication network peer, the outgoing session message being derived at least in part by applying the identified at least one transparency behavior to the incoming session message; and
   sending the outgoing session message from the communication network node to the second communication network peer.

18. The method according to claim 1, wherein the deriving of the outgoing session message to be sent to the second communication network peer includes applying the transparency behavior associated with one or more of the plurality of transparency types to the incoming session message independent of properties associated with the second communication network peer.

19. The device according to claim 9, wherein the processor is further operable to:
   apply the transparency behavior associated with one or more of the plurality of transparency types to the incoming session message independent of properties associated with the second communication network peer.

20. The method according to claim 17, wherein the deriving of the outgoing session message to be sent to a second communication network peer includes applying the identified at least one transparency behavior to the incoming session message independent of properties associated with the second communication network peer.

* * * * *